United States Patent
Kuźmicz et al.

(10) Patent No.: US 11,249,725 B1
(45) Date of Patent: Feb. 15, 2022

(54) METHOD AND APPARATUS FOR HIGHLY EFFECTIVE ON-CHIP TRUE RANDOM NUMBER GENERATOR UTILIZING BETA DECAY

(71) Applicants: Wieslaw Bohdan Kuźmicz, Warsaw (PL); Jan Jakub Tatarkiewicz, San Diego, CA (US)

(72) Inventors: Wieslaw Bohdan Kuźmicz, Warsaw (PL); Jan Jakub Tatarkiewicz, San Diego, CA (US)

(73) Assignee: RANDAEMON SP. ZO.O., Warsawa (PL)

( * ) Notice: Subject to any disclaimer, the term of this patent is extended or adjusted under 35 U.S.C. 154(b) by 0 days.

(21) Appl. No.: 17/409,971

(22) Filed: Aug. 24, 2021

Related U.S. Application Data

(60) Provisional application No. 63/234,820, filed on Aug. 19, 2021, provisional application No. 63/235,031, filed on Aug. 19, 2021, provisional application No. 63/224,811, filed on Jul. 22, 2021.

(51) Int. Cl.
  *G06F 7/58* (2006.01)
  *G21H 5/00* (2006.01)

(52) U.S. Cl.
  CPC ............ *G06F 7/588* (2013.01); *G21H 5/00* (2013.01)

(58) Field of Classification Search
  CPC .................................. G06F 7/588; G21H 5/00
  USPC ......................................................... 708/255
  See application file for complete search history.

(56) References Cited

U.S. PATENT DOCUMENTS

| | | | |
|---|---|---|---|
| 3,445,591 A | 5/1969 | Koehler |
| 3,546,356 A | 12/1970 | Graybill |
| 3,790,768 A | 2/1974 | Chevalier |
| 4,527,798 A | 7/1985 | Siekierski |
| 4,855,690 A | 8/1989 | Dias |
| 4,905,176 A | 2/1990 | Schulz |
| 5,570,307 A | 10/1996 | Takahshi |
| 5,627,894 A | 5/1997 | Albert |
| 5,732,138 A | 3/1998 | Noll |
| 5,987,483 A | 11/1999 | Edelkind |

(Continued)

FOREIGN PATENT DOCUMENTS

WO 2014080272 A1 5/2014

OTHER PUBLICATIONS

International Search Report and Written Opinion for PCT/US2019/017748 dated Dec. 30, 2019 (6 pages).

(Continued)

*Primary Examiner* — Tan V Mai
(74) *Attorney, Agent, or Firm* — Manuel de la Cerra

(57) ABSTRACT

A true random number generator (TRNG) is disclosed, comprising an enclosure enclosing, a radiation source (preferably radioactive nickel), and a cavity separating the radioactive nickel from a linear array of cells. The cells include a silicon substrate with a detector constructed to detect electrons within the cavity from the decay of the nickel and to produce a signal for the detected energy. The amplifier connected to the detector amplifies the signal and passes it to the memory for storage. A control block is connected to each cell in the linear array (a) sends a word line signal to each cell, causing the memory to report its contents to an output buffer/memory via a bit line, and also (b) sends a reset signal to each cell, causing the memory to erase.

17 Claims, 10 Drawing Sheets

(56) References Cited

U.S. PATENT DOCUMENTS

| | | |
|---|---|---|
| 6,249,009 B1 | 6/2001 | Kim |
| 8,001,054 B1 | 8/2001 | Peart |
| 6,346,700 B1 | 2/2002 | Cunningham |
| 6,415,309 B1 | 7/2002 | Shilton |
| 6,430,170 B1 | 8/2002 | Saints |
| 6,539,410 B1 | 3/2003 | Klass |
| 6,542,014 B1 | 4/2003 | Saito |
| 6,687,721 B1 | 2/2004 | Wells |
| 6,697,829 B1 | 2/2004 | Shilton |
| 6,745,217 B2 | 6/2004 | Figotin |
| 7,031,991 B2 | 4/2006 | Hars |
| 7,124,157 B2 | 10/2006 | Ikake |
| 7,476,370 B2 | 1/2009 | Mitsugashira |
| 8,001,168 B2 | 8/2011 | Tsuyuzaki |
| 8,037,117 B2 | 10/2011 | Saito |
| 9,335,972 B2 | 5/2016 | Yang |
| 10,430,161 B1 | 10/2019 | Tatarkiewicz |
| 2004/0035201 A1 | 2/2004 | Vincze |
| 2009/0165086 A1 | 6/2009 | Trichina |
| 2012/0030268 A1 | 2/2012 | Liu |
| 2015/0064047 A1 | 3/2015 | Elwha |
| 2018/0217817 A1 | 8/2018 | Gorfinkle |
| 2019/0235839 A1* | 8/2019 | Clark ............... G06F 7/588 |
| 2019/0258458 A1 | 8/2019 | Walmsley |
| 2019/0310830 A1 | 10/2019 | Tatarkiewicz |
| 2019/0347076 A1 | 11/2019 | Park |
| 2020/0065068 A1 | 2/2020 | Hekmatshoartabari |
| 2020/0092328 A1 | 3/2020 | Kim |
| 2020/0210147 A1 | 7/2020 | Lee |

OTHER PUBLICATIONS

International Search Report in PCT/US2020/065962 dated Apr. 22, 2020 (6 pages).

* cited by examiner

METHOD AND APPARATUS FOR HIGHLY EFFECTIVE ON-CHIP TRUE RANDOM NUMBER GENERATOR UTILIZING BETA DECAY

PRIORITY APPLICATIONS AND REFERENCES

This application claims priority to U.S. Provisional Application Ser. 63/224,811 titled "Method And Apparatus For Highly Effective Beta Decay Based On-Chip True Random Number Generator" and filed on Jul. 22, 2021; to U.S. Provisional Application Ser. 63/234,820 titled "Method And Apparatus For Highly Effective Beta Decay Based On-Chip True Random Number Generator" and filed on Aug. 19, 2021; and to U.S. Provisional Application Ser. 63/235,031 titled "Method And Apparatus For Highly Effective Beta Decay Based On-Chip True Random Number Generator" and filed on Aug. 19, 2021, all of which are incorporated herein by reference in their entireties.

This application is also related to U.S. Provisional Application Ser. 62/984,528 filed on Mar. 3, 2020 and titled "Method And Apparatus For Tritium-Based True Random Number Generator"; to U.S. Provisional Application Ser. 63/062,672 filed on Aug. 7, 2020 and titled "Method And Apparatus For Beta Decay Based True Random Generator"; to U.S. Provisional Application Ser. 62/655,172 filed on Apr. 9, 2018 and titled "Apparatus, Systems, And Methods Comprising Tritium Random Number Generator"; to U.S. Provisional Application Ser. 62/803,476 filed on Feb. 9, 2019 and titled "Apparatus, Systems, And Methods Comprising Tritium Random Number Generator", now U.S. Pat. No. 10,430,161; to U.S. application Ser. No. 16/273,365 filed on Feb. 12, 2019 and titled "Apparatus, Systems, And Methods Comprising Tritium Random Number Generator"; to U.S. application Ser. No. 16/990,087 filed on Aug. 11, 2020 and titled "Apparatus, Systems, And Methods For Beta Decay Based True Random Number Generator", now U.S. Pat. No. 10,901,695; U.S. application Ser. No. 17/126,265 filed on Dec. 18, 2020 and titled "Method and Apparatus for Tritium-based True Random Number Generator", now U.S. Pat. No. 11,048,478; to U.S. application Ser. No. 17/062,307 filed on Oct. 2, 2020 and titled "Apparatus, Systems, And Methods For Beta Decay Based True Random Number Generator", now U.S. Pat. No. 11,036,473; to PCT Application PCT/US19/17748 titled "Apparatus, Systems, And Methods Comprising Tritium Random Number Generator" and filed on Feb. 13, 2019; to PCT Application PCT/US20/65962 titled "Apparatus, Systems, And Methods For Beta Decay Based True Random Number Generator" and filed on Dec. 18, 2020; and to PCT Application PCT/US20/65976 titled "Apparatus, Systems, And Methods For Beta Decay Based True Random Number Generator" and filed on Dec. 18, 2020. Each of the patent applications, issued patents, and other references discussed and/or cited herein, are incorporated by reference as though fully set forth herein.

Referenced herein and also incorporated are the following: (1) M.-M. Bé et al. 2008 Bureau International des Poids et Mesures, Sevres (France) BIPM-5 vol. 1-7 *Table of Radionuclides*; (2) Belghachi A. et al. 2020 Acta Physica Polonica A vol. 137, no. 3, pp. 324-331, *A model of Ni-63 source for betavoltaic application*; and (3) Knechtel J. et al. 2017 PSJ Transactions on System LSI Design Methodology vol. 10 pp. 45-62 *Large-Scale 3D Chips: Challenges and Solutions for Design Automation, Testing, and Trustworthy Integration.*

TECHNICAL FIELD

The present disclosure relates generally to true random number generators, specifically random number generator technologies utilizing the spontaneous nickel isotope decay, as well as apparatus, systems, and methods regarding the same.

BACKGROUND

As opposed to pseudo-random number generators based on numerical algorithms, there are true random number generator (TRNG) devices that depend on natural random processes: multiple bipolar switches, thermal noise, light scattering by dichroic mirrors, chaotic systems, and decay of radioactive nuclei. Some of these TRNGs are listed in the provisional applications to which the present application claims priority, and those references are incorporated herein by reference as though fully set forth herein.

The decay of radioactive nuclei type is considered to be the most independent from environmental influences like temperature, pressure, or acceleration. However, typical nuclear-based TRNGs require large-sized detectors to enable the registration of particles emitted as a result of radioactive decays. Also, many nuclei used in such devices are highly radioactive and poisonous, hence dangerous to humans if a device is broken.

Therefore, a safe and small TRNG that will not expose the user to dangerous levels of radiation would be advantageous. Such a TRNG can then be used in compact personal devices.

SUMMARY

A true random number generator (TRNG) is disclosed with an enclosure enclosing a radiation source (preferably radioactive nickel) and a cavity separating the radioactive nickel from a linear array of cells. The cells include a silicon substrate with a detector constructed to detect electrons emitted within the cavity from the decay of the nickel and to produce a signal for the detected energy. The amplifier connected to the detector amplifies the signal and passes it to the memory for storage. A control block that is connected to each cell in the linear array (a) sends a word line signal to each cell, causing the memory to report its contents to an output buffer/memory via a bit line, and also (b) sends a reset signal to each cell, causing the memory to erase.

The processing circuitry may be connected to the detector with a Through Silicon Via (TSV) such that the silicon substrate at least partially shields the processing circuitry from electrons emitted by the radioactive nickel. The processing circuitry comprises one or more of the following: the amplifier, the memory, and the control block.

A clock may be connected to the control block, which in turn uses the clock to manage the word line signal and the reset signal for the linear array of cells. A serial interface or a plurality of serial interfaces may be connected to the output buffer/memory of each cell.

The clock may include a slow clock and a fast clock. The control block may use the fast clock to manage the word line signal and may use the slow clock to manage the reset signal. The clock may also have a frequency divider to maintain a relationship between the slow clock and the fast clock.

The time between reset signals defines a readout period, and the TRNG may further include an OR gate connected to a transmission gate of each cell. For each cell, the OR gate produces a single counting signal to a counter during a readout period, but only when the detector detects electrons within the cavity from the decay of the nickel. The counter sends a stop signal to the control block when a predetermined number of counting signals have been counted, and also resets itself. Upon receiving the stop signal, the control block sends the word line signal and reset signal to each cell. The predetermined number of counting signals may be, but is not limited to, 512.

The TRNG may further include a cryptographic client and may be constructed of a matrix of linear arrays. The linear array may be comprised of, but is not limited to, 1024 cells. The TRNG may have, but is not limited to having, a matrix of 1024 by 1024 cells.

Additional aspects, alternatives, and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF EXAMPLE EMBODIMENTS

Figure 1:
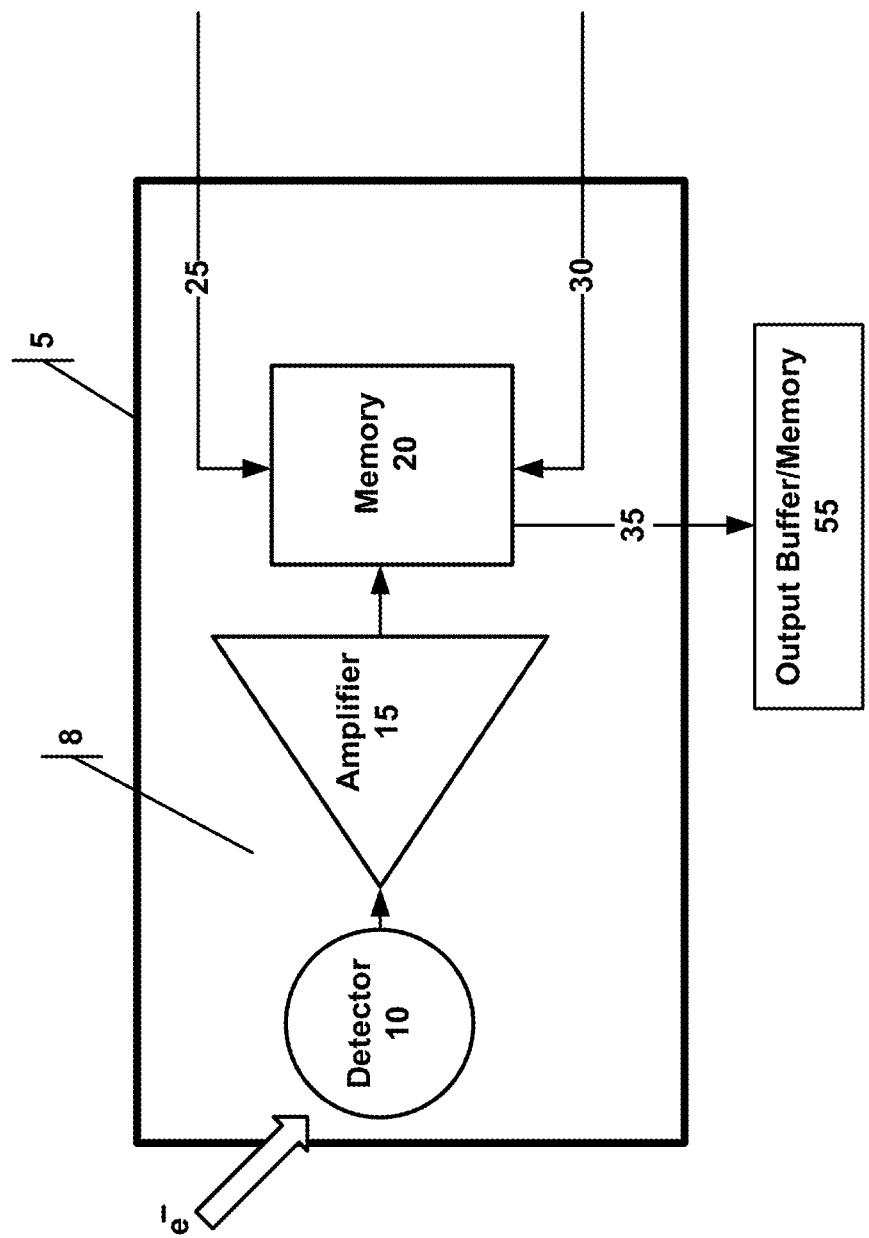
FIG. 1 illustrates a circuit for registering electron hits of the detector.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship, or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds to the attached figures and is provided for ease of reference, where like reference numerals designate corresponding features throughout the specification and figures:

Cell 5
Cell 5A
Silicon Substrate 8
Detector 10
Amplifier 15
Memory 20
Word Line 25
Reset Line 30
Bit Line 35
Cell Linear Array 40
Cell Linear Array 40A
Control Block 45
Clock 50
Slow Clock 50A
Fast Clock 50B
Frequency Divider 50C
Output Buffer/Memory 55
Output Bits 60
M×P Cell Array Matrix 65
Serial interface 70
Transmission Gate 72
Transmission Gate Control Signal 74
OR Gate 75
Counter 80
Stop Signal 82
TRNG Detector Chip with Cell Array Matrix 85
Chip Cover/Enclosure 90
Radioactive Source 95

Cavity 100
Through Silicon Vias/Connections 105
Processing Circuitry 110
Cryptographic Client 115

This is related to our previous published US patents and applications listed above, in which we described the general idea of using pure beta minus (electron emission) nuclear decay as a medium or source of entropy for generating true random numbers by detecting emitted electrons on-chip through an electronic sensor or array of sensors. In this application, we would like to present the approach that allows for a much faster or more efficient (larger number of bits per time unit) generation of random numbers on-chip from the very same source of entropy i.e., $^{63}$Ni.

Searching the BIPM *Table of Radionuclides* (2008), we find three abundant nuclides that produce pure beta-minus decay (only emission of an electron and to conserve the momentum of some practically undetectable neutrino) in the range of energies below 512 keV (to avoid the energy of electrons that produces highly penetrable gamma rays, creating potential radiation hazard) and having reasonable half-life times of more than ten years. There are some other exotic nuclides listed in the abovementioned tables that fulfill our requirements, but they are mostly by-products of decays of other exotic nuclides, hence not practical for industrial applications. The three nuclides easiest to obtain and to process are:

a. 1. $^3$H tritium with the maximum energy of emitted electrons being 18 keV (mean energy about 5.7 keV) and a half-life time of about 12.4 years, b. 2. $^{63}$Ni nickel with the maximum energy of emitted electrons being about 67 keV (mean energy about 17 keV) and a half-life time of about 98.7 years, and c. 3. $^{14}$C carbon with the maximum energy of emitted electrons being about 156 keV (mean energy about 45 keV) and a half-life time of about 5,700 years.

When dealing with these low-energy radiative nuclei (except in the case of gaseous tritium, which is very difficult to handle due to its high permeation through solids, making it better processed in the form of gel or solid compound, as discussed in our U.S. Pat. No. 11,048,478), one has to note that because of the limited range of emitted electrons in solids (due to self-absorption of electrons), only a very thin layer of radioactive material is externally active i.e., electrons emitted from the material are created only in a very thin layer. For example, $^{63}$Ni has a maximum surface radioactivity of about 20 mCi/cm$^2$ independently of increasing thickness of the material, cf. Belghachi et al. (2020)—only about 10 microns of such a material is relevant for external radioactivity. We note that because 1 Ci equals about $3.7 \cdot 10^{10}$ decays/sec, the limit of 20 mCi/cm$^2$ corresponds to about $7.4 \cdot 10^8$ decays/(cm$^2$·sec) or slightly less than $10^9$ decays/(cm$^2$·sec). This suggests that a potential on-chip random number generator based on $^{63}$Ni can produce up to 1 billion bits per second from 1 cm$^2$ of the detector area, with more area taken by other electronics. The low energy of tritium beta decay makes the thickness of the active layer much thinner than for other pure beta decay radionuclides considered here, and thus gives a smaller maximum number of bits generated per area. On the other hand, the half-life time of a given nuclide limits the total number of electrons emitted per time unit. For example, with 10 billion or $10^{10}$ atoms of $^{63}$Ni, only half will decay during 98.7 years, or about 2 per second. For $^{14}$C radionuclide with a very long half-life time, this severely limits the total possible radioactivity per time unit: one needs about a trillion or $10^{12}$ atoms of $^{14}$C to get 2 decays per second or, in other words, 100× more carbon 14 nuclei are needed for the same radioactivity as for nickel 63. In other words, about 12× larger area of radioactive material will be required to get the same effective number of decays per second because the range of 45 keV electrons (average energy) in carbon is only about 8× larger than that of the 17 keV electrons (average energy) in nickel, cf. Berger and Seltzer (1982) (the effective layer can be 8× thicker). Therefore, $^{63}$Ni seems to be at the sweet spot of efficiency per surface of radioactive material as a source of entropy for on-chip random number generators. However, its maximum radioactivity still limits the number of bits that can be generated on the chip because one cannot use too-big detectors due to the so-called detector reaction dead time. The shortest time between pulses that can be detected depends on the low capacitance of the detector—this capacitance increases proportionally to the area of a detector. In our U.S. Pat. No. 11,036,473, we suggested using an array of small detectors that can be applied to overcome the abovementioned limitation. Here we describe problems associated with such an approach and present methods to solve these problems.

The main problem of all random number generators based on natural phenomena like the emission of photons or electrons (known pure quantum processes) is the stability of the entropy source. In the case of photon-based devices, the source of photons is highly dependent on temperature, supplied voltage, and long-term stability of light emitter (diode or laser) among other factors. For beta decays, resulting from weak interactions inside the nuclei, there is no influence of external fields (like gravitational or electromagnetic) on the timing or direction of decays. Only at very low temperatures close to absolute zero and in very high magnetic fields do these decays show anisotropy or the so-called parity violation, cf. Nobel Prize 1957. The only effect on the stability of the radionuclide entropy source at normal conditions is its own half-life time that diminishes the number of decays in time. As mentioned above, for $^{63}$Ni the half-life time is about 98.7 years. According to an exponential equation that governs the number of decays in time, $N=N_0 \cdot e^{-\lambda t}$ (N is the number of atoms left from the initial number $N_0$ after time t with $\lambda=\ln(2)/t_{1/2}$, where $t_{1/2}$ is half-life time), after 2 years there will be still 98.6% of nickel 63 radioactive atoms left, or, in other words, initially, nickel activity will only diminish by less than 0.7% per year. That can be easily corrected by the process of self-calibration mentioned in our U.S. Pat. No. 11,036,473 (changing of the read-out time).

Let us make simple estimates for the number of small detectors required to generate 1 billion or $10^9$ bits per second with a $^{63}$Ni entropy source. Assuming an individual detector radius of 11 microns and an entropy source with an activity of 15 mCi/cm$^2$, we get about 527 counts per second per detector area. 1,024 detectors reading at the rate of 1,000 times per second will give us (as per our U.S. Pat. No. 11,036,473) the number of 1 million bits per second. However, diode detectors (such as PIN, SPAD, or APD diode), unlike pixels of CCD cameras, cannot collect charge and require additional, simple memory circuits and readout lines to retain counts.

A simple cell 5 required to register any electron hits of the detector is presented in FIG. 1. The cell 5 is comprised of a silicon substrate 8 with a detector 10, connected to an amplifier 15, and to a memory 20 to store a detection event. The amplifier 15 amplifies the pulse produced by the detector 10 when an electron hits the detector 10 and has a write buffer at the output. This buffer writes "1" to the memory 20 when an electron is detected. Subsequent detection events at the very same detector will not change the state of the memory cell. Thus, the memory cell may contain only zero or one—the equivalent of one random bit. The cell 5 may have a word line 25 that, when signaled, causes the memory 20 to report its contents on the bit line 35. The reset line 30 clears the cell of its memory to ready the cell for another detection period.

Figure 2:
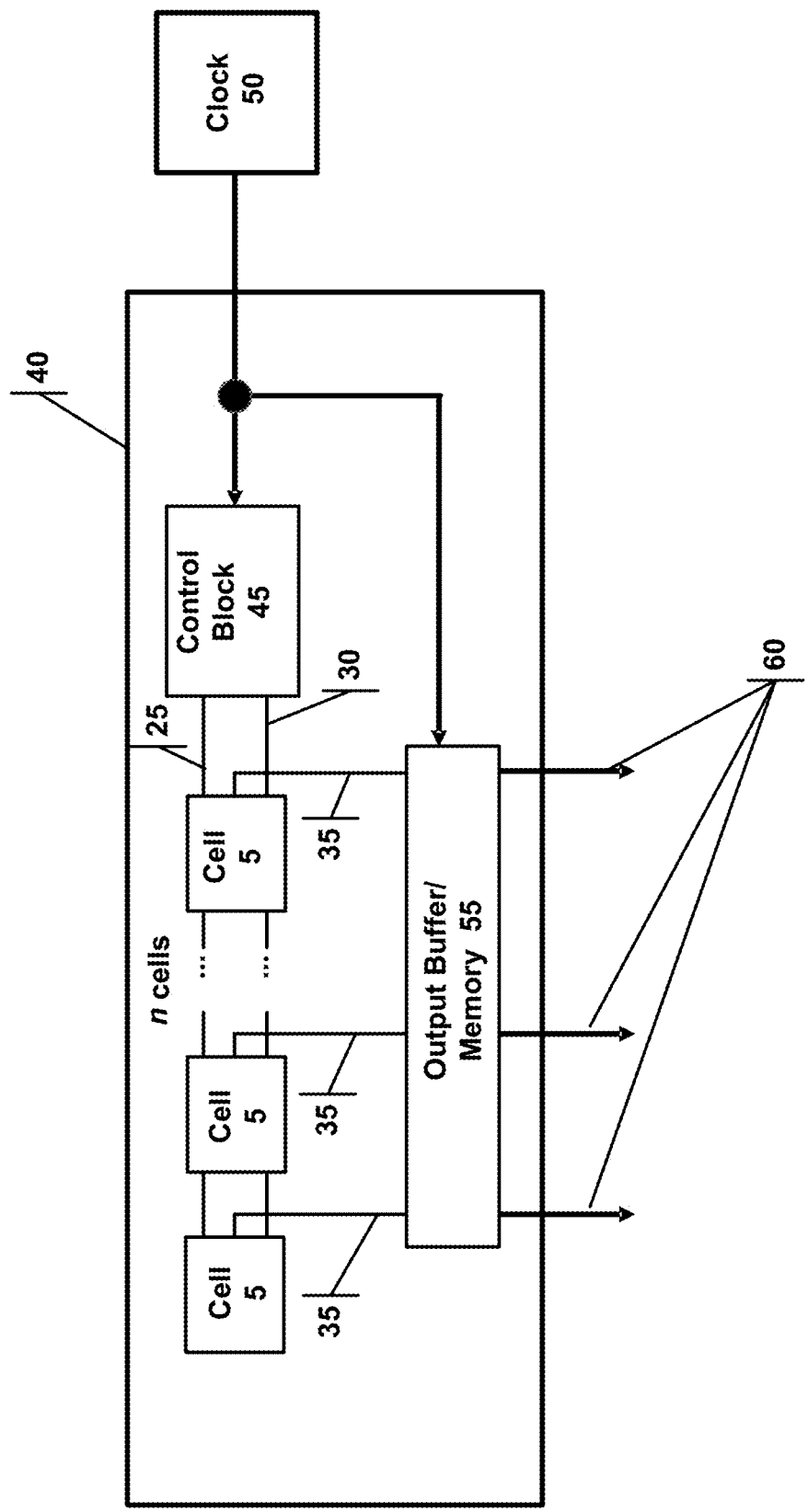
FIG. 2 diagrams an arrangement of a linear array of n cells, each with its processing cell beneath.
Figure 3:
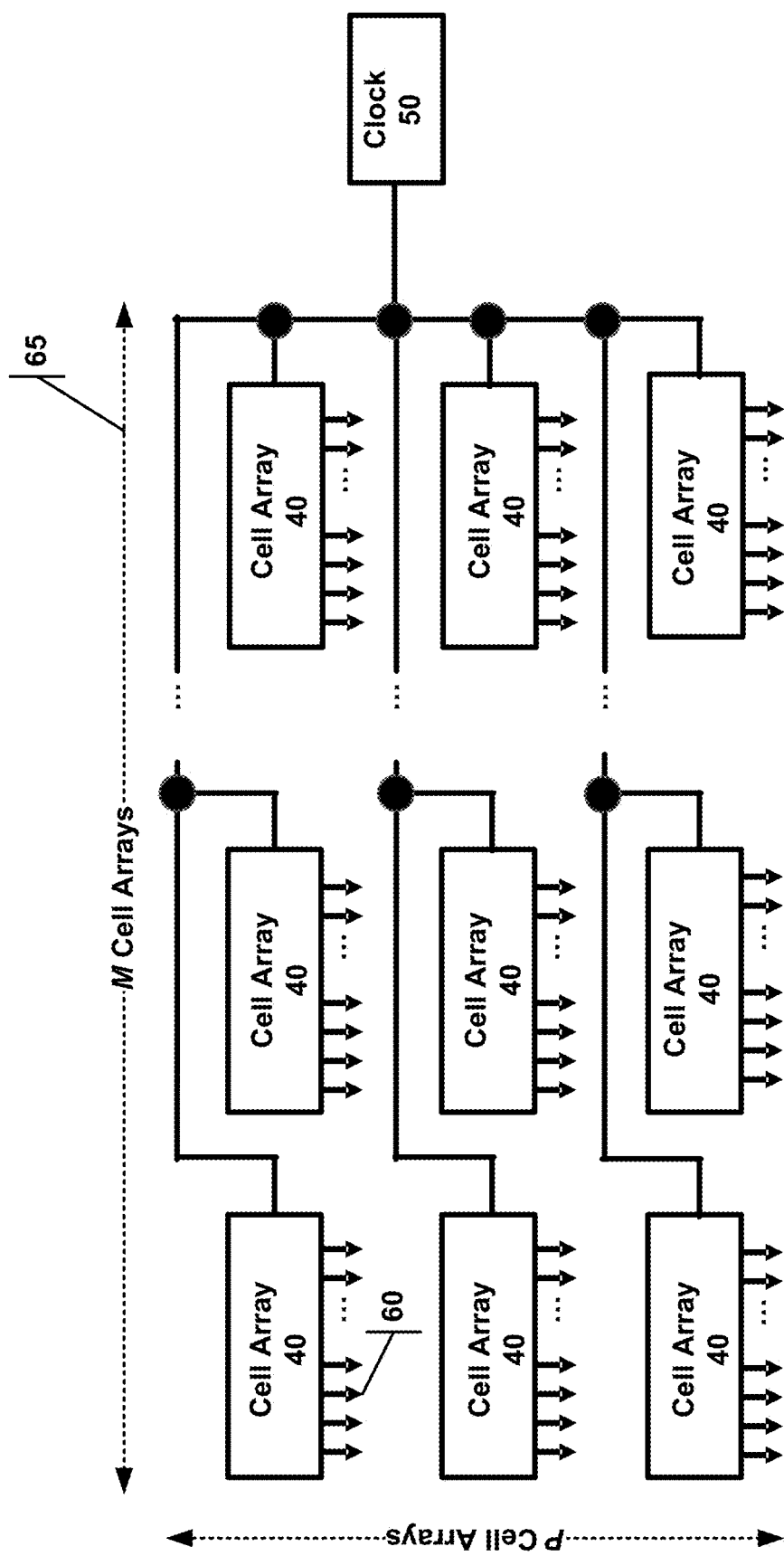
FIG. 3 illustrates a matrix of linear arrays.

FIG. 2 presents an arrangement of a linear array 40 of n cells 5, each with its processing cell beneath. The state of all the cells 5 in the array is read and stored in the output buffer/memory 55 via the bit lines 35 when this linear array 40 is selected with "1" on the word line 25. New contents in the output buffer/memory 55 replace the previous one. The readout times are controlled by the clock 50. Once the states of all the cells 5 in the linear array 40 are stored in the output buffer 55, the states of the cells 5 in this linear array 40 are reset to "0" through the reset signal "1" on the reset line 30; these functions are performed by the control block 45, which uses the clock 50 to manage signal administration. Such a linear array 40 will produce n random bits every 1 millisecond. To obtain more bits from a matrix of such linear arrays, they can be arranged as shown in FIG. 3. A M×P cell array matrix 65, comprised of P linear arrays 40 just described, each producing n bits, will produce M×P×n bits every millisecond. The M×P cell array matrix 65 may generate an array of true random numbers and may provide the array to a cryptographic client 115 (see FIGS. 9 and 10) and may then delete the delivered true random number from the memory.

Figure 4:
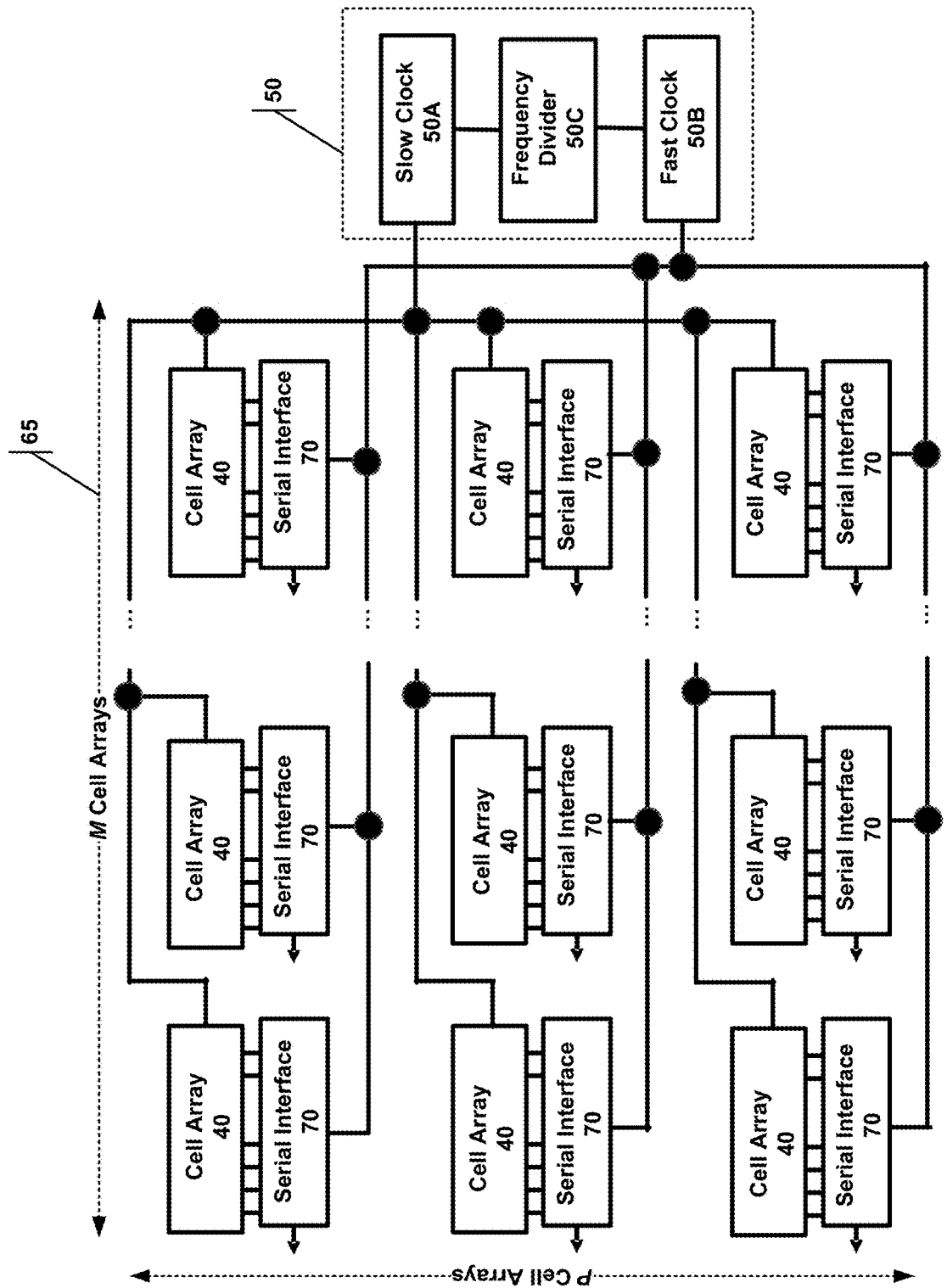
FIG. 4 illustrates the serial interface circuit used within a matrix of linear arrays.

If every bit is to be transmitted to the output individually, as in FIG. 3, the number of bits per chip will be severely limited by a large area (such as e.g., 50 by 400 micrometers or more) needed for electrostatic discharge protection circuits and output bonding pads. To overcome this limitation, the random output bits 60 can be transmitted to the outputs serially using serial interface circuits 70, as shown in FIG. 4. The operation of these circuits 70 will be controlled by a fast clock 50B, with a frequency that is high enough to transmit all bits from the linear arrays 40 in less time than the readout time. For example, if the linear arrays 40 are read every 1 millisecond, the frequency of the fast clock 50B should not be lower than the number of bits in the linear arrays divided by 1 millisecond (assuming that one bit is transmitted to the output at each cycle of the fast clock). Both clock sources, the fast clock 50 controlling the serial interface circuits 70 and the slow clock 50A controlling the readout time, will be synchronized using a frequency divider 50C. In other words, the control block 45 uses the fast clock 50B to manage the word line signal 25 and uses the slow clock 50A to manage the reset signal 30, and the frequency divider 50C maintains a relationship between the slow clock 50A and the fast clock 50B.

The fact that each detector has its own memory to store information about detected electron(s) in each read-out cycle makes it possible for another method of self-calibration of the described random number generator. In the example calculations given in Table 1, we show that a radiation source with 15 mCi/cm$^2$ activity can generate on average about 527 electrons that can hit a single 11-micron round detector during 1 second. If the number of "0s" and "1s" thus created is not equal, instead of adjusting the clock rate for read-out as suggested in our earlier patent, the system can slightly change the number of active detectors in each row. For example, if the number of "1s" due to the high counting rate is consistently on average at 550 per 1,000 detectors, then by activating only 909 detectors, the generator will return the balanced number of "0s" and "1s" (909=1,000/ 550.500). This type of self-adjustment can be done frequently, for example, every second or after 1,000 read-outs to assure good statistical properties. In reality, the controller does not need to "switch off" detectors—equivalent action can be taken on bits in the output buffer/memory 55: if the count of "1s" is too high as explained above, only 909 bits will be taken every time read-out is performed (the number of bits will be diminished in whole 8-bit words; thus, instead of 909 bits, we will use only 904 bits (904=909−MOD[909, 8], where MOD is a modulo function or the rest of division by a given number). Each adjustment of the balancing will slightly change the number of bits read from the output buffer/memory 55. It is important to ensure that the total number of detectors in each linear array (or possible total number of counts) will be higher than the effective number of detectors needed for balanced counting of "0s" and "1s", thus allowing also for the correction in time of diminishing number of counts due to finite half-life time of radioactive material used.

The following table gives details of our approximate calculations or estimates and shows that a design based on $^{63}$Ni and an array of diodes can theoretically reach up to 0.6 Gb per second and per cm$^2$ of the chip.

TABLE 1

| Single Detector (10) | |
| --- | --- |
| size of a pixel | 9.5 · 10$^{-5}$ mm$^2$ for 11 micron round detector |
| $^{63}$Ni source activity | 15 mCi/cm$^2$ |
| activity per pixel area | 1.4 · 10$^{-5}$ mCi |
| estimated counts | 527 counts/second; cf. 3.7 · 10$^{10}$ decays/sec = 1 Ci |
| Line Array of Detectors (40, 40A) | |
| line of | 1,024 pixels |
| area used | 0.0015 cm$^2$ including 1-micron borders on sides |
| reading frequency | 1048 fps |
| bits generated | 1.1 · 10$^6$ per second |
| Matrix of Line Arrays (65) matrix of 32 × 32 lines: | |
| 1,024 lines | 1.51 cm$^2$ |
| connections | 0.20 cm$^2$; 50 μm × 400 μm each |
| total area | 1.71 cm$^2$ |
| total bits | 6.4 · 10$^8$ per (second · cm$^2$) |

Another method of self-calibration that uses all detectors but changes the sampling time was described in our previous U.S. Pat. No. 11,036,473. In this approach, electrons hit an array of detectors (for example 32×32 or a total of 1,024 detectors) in a given time, typically 1 millisecond.

Figure 5:
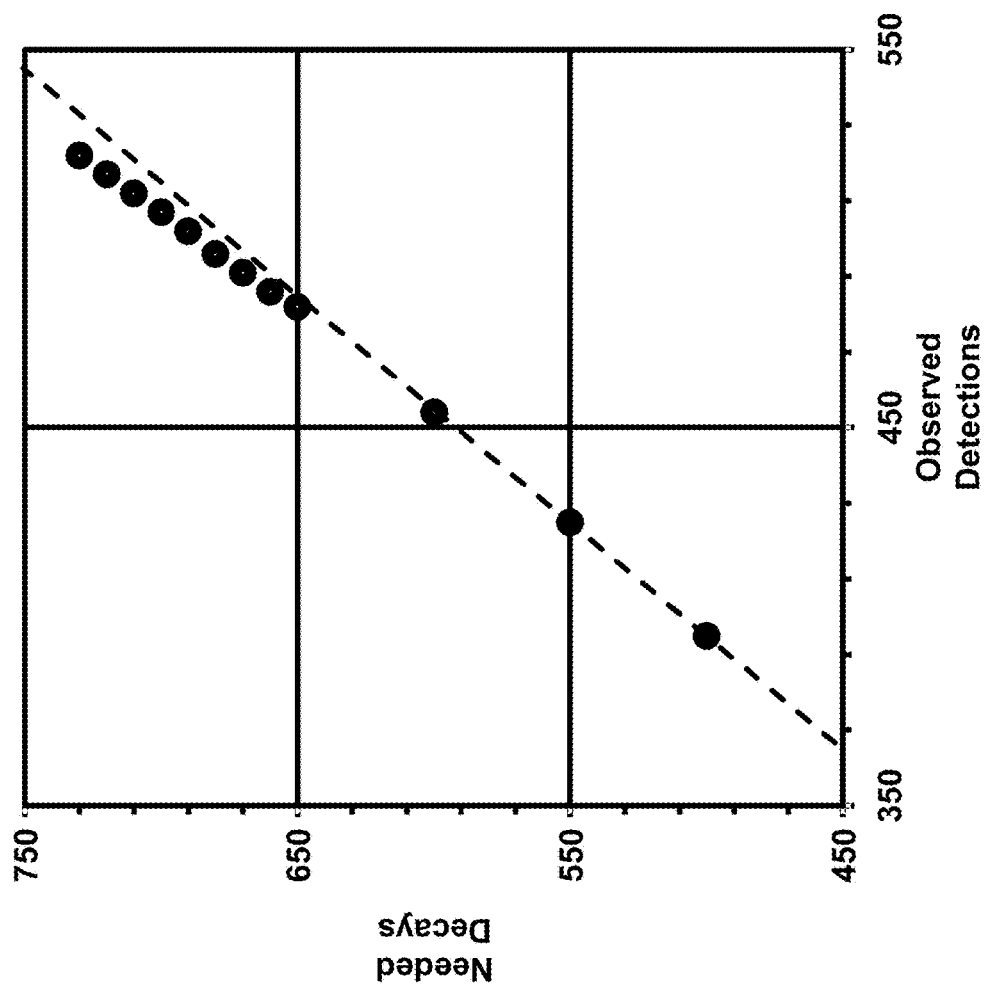
FIG. 5 is a graph illustrating the "Observed Detections" or number of detectors that registered at least one electron hit, while "Needed Decays" is the number of electrons needed to be generated to get "Observed Detections" values.

Nuclear-physics-based calculations, as described in the earlier sections and summarized in Table 1, do not account for the simple fact that several electrons can hit the same detector in one cycle thus lowering the number of "1s" generated in this cycle. The probability of multiple electrons hitting the same detector is not so small as to be negligible. A Monte-Carlo simulation assuming 1,024 detectors and a variable number of electrons is shown in FIG. 5. "Observed Detections" is the number of detectors that registered at least one electron hit, while "Needed Decays" is the number of electrons needed to be generated to get "Observed Detection" values. As expected, the process is nonlinear, i.e., with an increasing number of "1s", the probability of hitting a detector that was already hit becomes higher. For example, 527 electrons (in 1,000 simulations) on average will only change the state of 411 memories associated with detectors. This results in a correction: instead of 1,000 microseconds as estimated earlier, such an array will require about 710 generated electrons or 710/527=1,347 microseconds (about 35% longer), lowering the potential yield of the system of detectors as in Table 1 to about 0.5 Gb per second and per $cm^2$ of the chip. To make such adjustments automatic, one has to either use simulated data (as that presented in FIG. 5) and convert it into a lookup table or create such a table from experimental data obtained in a given geometry and technology. Once the lookup table is stored on the chip, the algorithmic approach will allow self-calibration that will also take care of other time-related phenomena described in this application.

Figure 6:
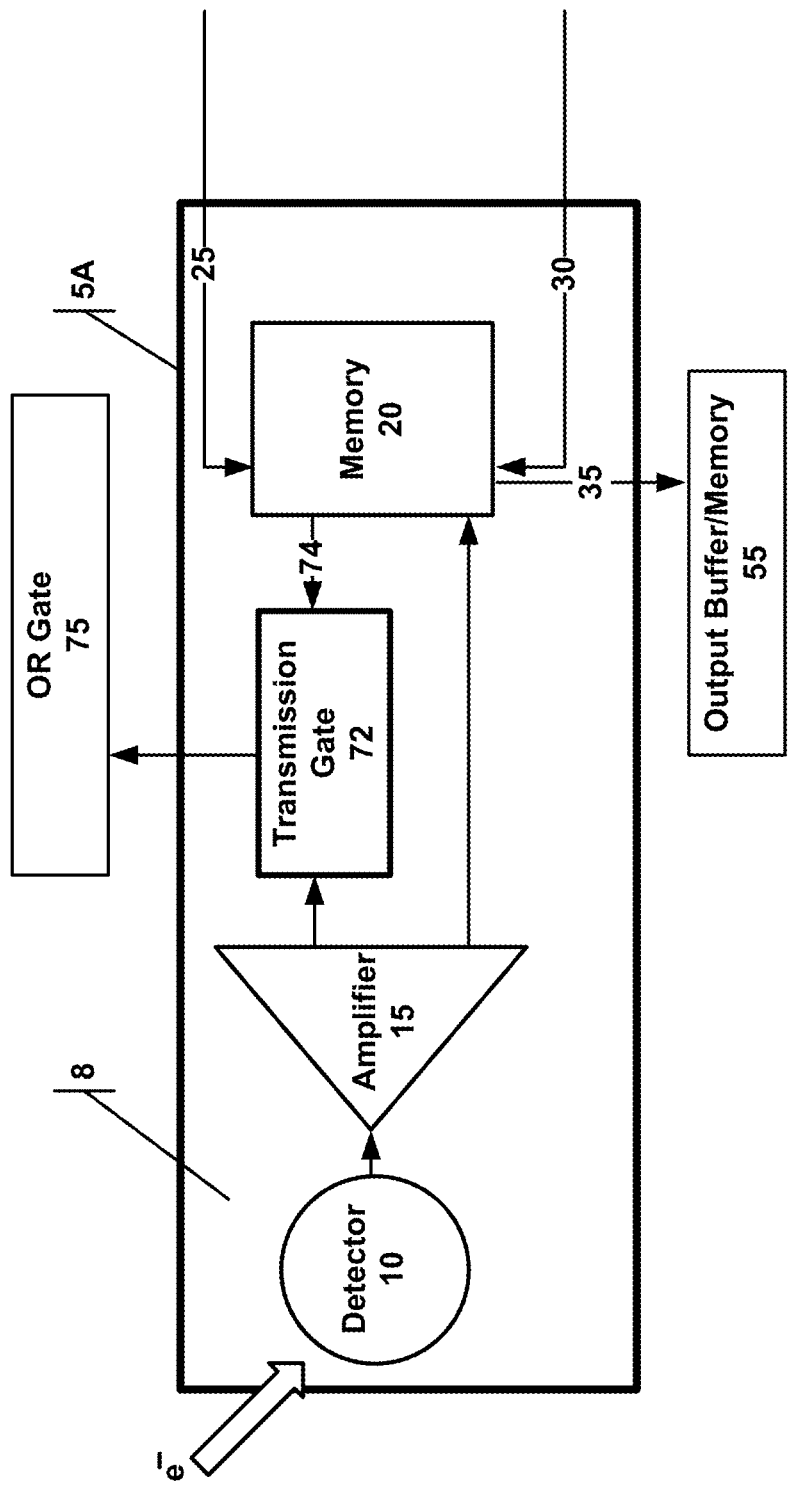
FIG. 6 illustrates an alternative circuit for registering electron hits of the detector with an OR gate employed.
Figure 7:
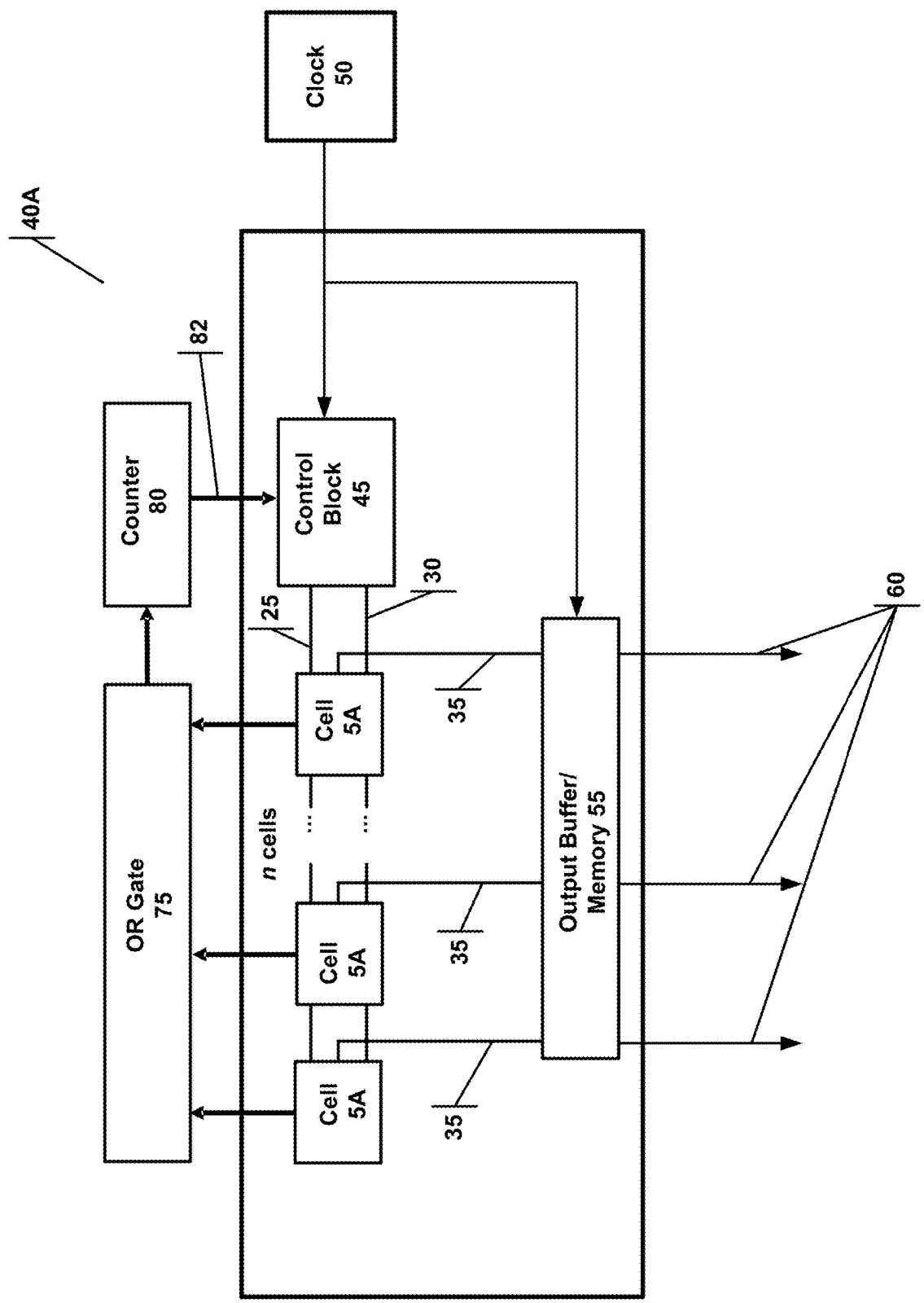
FIG. 7 diagrams an arrangement of a linear array of n detectors, each with its processing cell beneath.

The proper balance between numbers of zeros and ones in the generated random number, i.e., half of the number of bits equal to 0 and the other half equal to 1, can also be achieved in the way illustrated in FIGS. 6 and 7: making the clock period longer than needed, obtaining the proper number of "1s" and stopping the storage of pulses from the sensors (i.e., collection of "1s") when the number of "1s" reaches the proper value (in our example of 1,024 detectors, that would be 512 counted "1s"). FIG. 6 illustrates a cell 5A with some of the same components as cell 5 described with reference to FIG. 1, including a detector 10 connected to an amplifier 15 with output to a memory 20. The cell 5A also has a word line 25, a reset line 30, and a bit line 35 with the same functions previously described. The electrical signals from the detector 10, amplified by the amplifier 15 for each of the cells 5A in the linear array 40A (see FIG. 7), are directed via an OR gate 75 to a counter 80, which sends a stop signal 82 to the control block 45 when a predetermined number of "1s" has been obtained during a readout period (i.e., the time between reset signals). As mentioned above, in our example of a linear array of 1,024 cells, that would be 512.

Once the stop signal 82 is given to the control block 45, which then issues the word line 25 signal to dump the memory 20 of the cells to the output buffer/memory 55, and issues the reset line 30 signal to reset the cells. The output buffer/memory 55 can then be read to create the true random number, and that number may be passed to a cryptographic client 115. Also shown in FIG. 6 is a transmission gate 72 that prevents counting more than one pulse from the same cell 5A within a readout period, should such pulses occur. Once one pulse is received, "1" is stored in the memory 20. The transmission gate 72 acts as a switch, with input from the amplifier 15, an output to the OR gate 75, and one control signal input from the memory 20 for a transmission gate control signal 74. The data flow from the input to the output is controlled by the transmission gate control signal 74. The transmission gate 72 is open when a "0" bit is stored in the memory 20 (CTR="0") and closes when "1" is stored there (CTR="1"); thus, the transmission gate 72 is closed when the detector 10 in the cell has already registered detection of an electron (causing a "1" to be stored in the memory 20). If another electron hits detector 10 in the same cell, no additional pulse will be transmitted via the transmission gate 72 to the OR gate 75, and ultimately to the counter 80. Subsequent detections from cell 5A during the same readout period are not reported to the counter 80, thus preventing the counter 80 from false counting of two "1" while in the memory only one "1" is stored. After sending the stop signal 82, counter 80 may reset itself. Alternatively, the counter may be ongoing and constructed to send the stop signal 82, when a multiple of the predetermined number has been reached.

Figure 8:
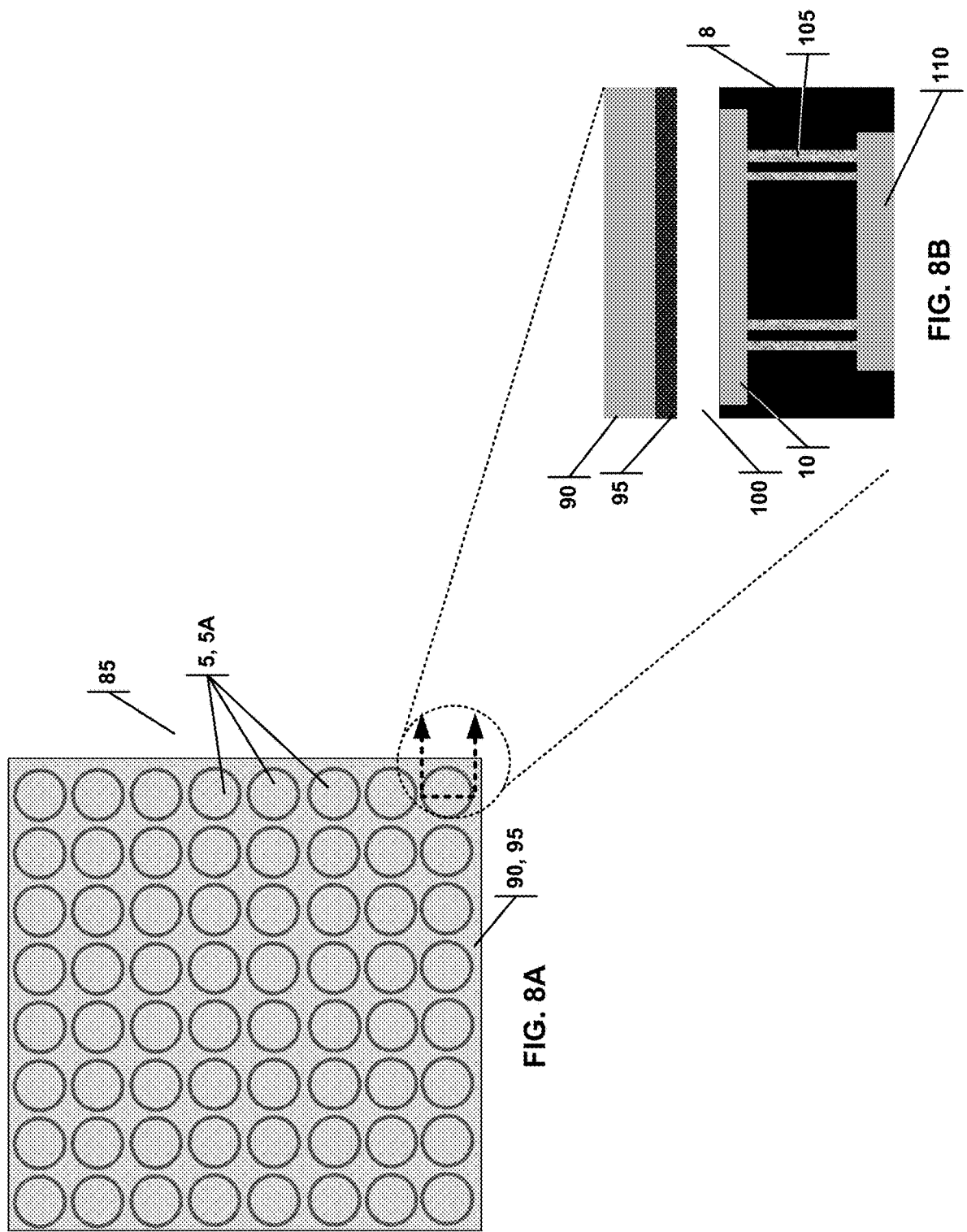
FIG. 8A is a top view of a detector chip with a cell array matrix with the cover and radioactive source made to be semi-transparent so that the array of detectors can be seen.
FIG. 8B is a cross-sectional view of a portion of a single detector chip within a cell array matrix, with a cell array of FIG. 8A illustrating a circuit for registering electron hits of the detector using through silicon vias.

When constructing a chip with the cell array matrix described above, the readout, memory, and processing circuitry should be protected from the radiation damage due to beta radiation. One way to achieve this protection is to cover our radiation source with a thick mask that will collimate electrons only in the direction of detectors and not onto their sides. Such a mask, however, is not easy to manufacture (small thick grid) and to align with detectors within the cell array. A technologically viable solution is to place the readout, memory, and processing circuitry under each detector (e.g., on the other side of the Si wafer). FIG. 8A illustrates a TRNG detector chip comprising a cell array matrix 85, a chip cover/enclosure 90 and a radioactive source 95 (both made to be semi-transparent so that the array of detectors 5, 5A can be seen). FIG. 8B is a cross-sectional view of a portion of the detector chip with a single detector cell from the array matrix of FIG. 8A. This cross-sectional view illustrates the chip cover/enclosure 90 and the radioactive source 95 (the preferred source is radioactive nickel), separated by a cavity 100 from the detector 10. The processing circuitry 110 connects to detector 10 by through silicon vias connections (TSV) 105 in the silicon substrate 8, thus protecting the processing circuit 110 from the beta radiation i.e., the electrons emitted by the radioactive source. The thickness of the TSV may be selected to optimize the protection of the processing circuitry 110. TSV are described e.g., in Knechtel J. et al. 2017. The Si wafer will have a total thickness of more than 10 microns so all electrons emitted by the radioactive source 95 will be absorbed in it. The processing circuitry 110 may include all or some of the processing components described above that are downstream of the detector 10 and may include the amplifier 15, the memory 20, the control block 45, the clock 50, the output buffer/memory 55, the serial interface 70, the transmission gate 72, the OR gate 75, the counter 80 and/or the cryptographic client 115 (which may optionally also be on the IC). The memory 20 can supply the necessary number of bytes (bits) on demand for e.g., secure random encryption of communication channels (i.e., cryptographic client 115) of the device in which this specialized IC is mounted or for random processes required by simulations, modelling, and gaming.

Figure 9:
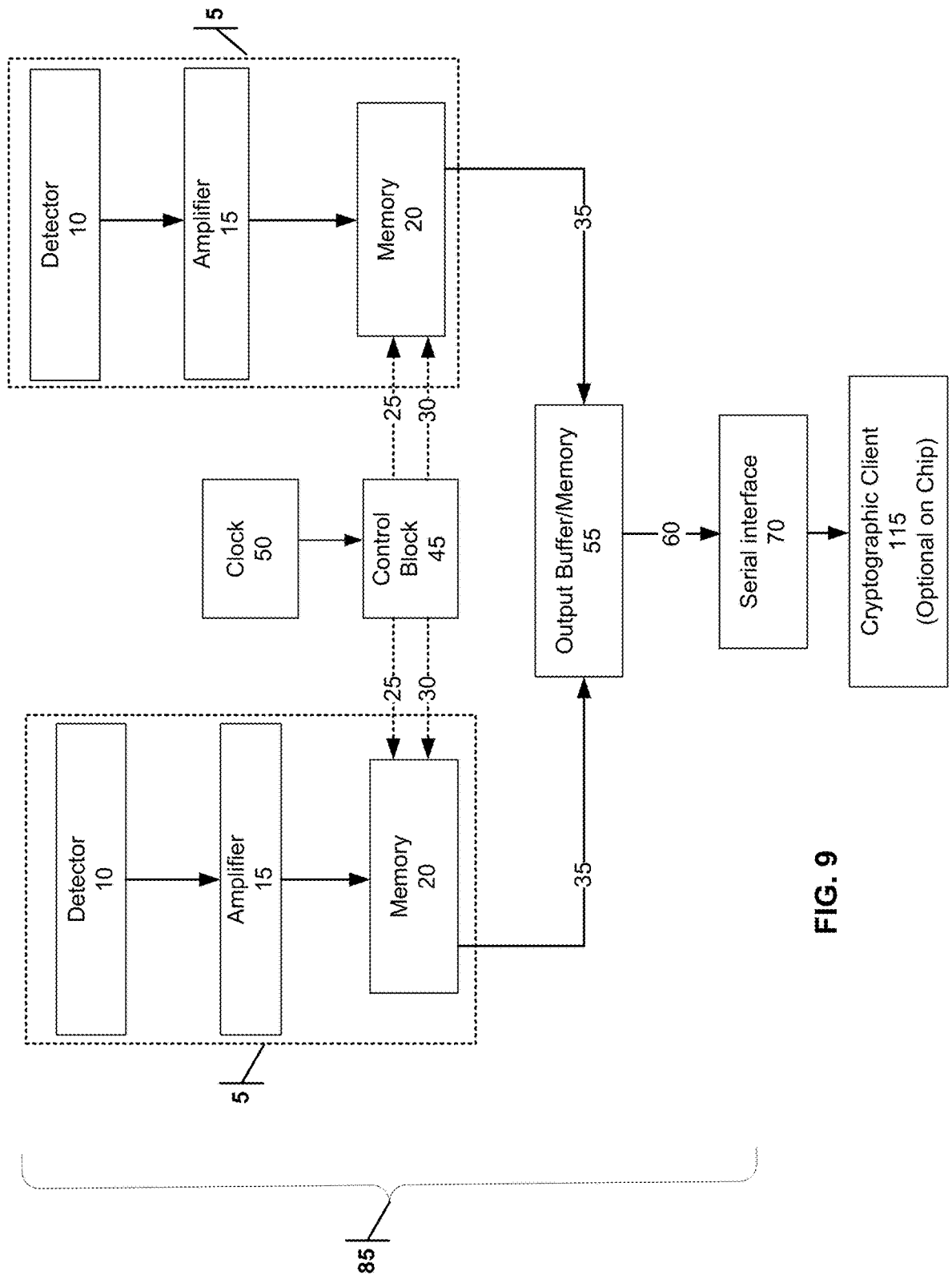
FIG. 9 is a flow diagram of the various components that may be placed on the integrated circuit corresponding to the FIG. 4 arrangement.
Figure 10:
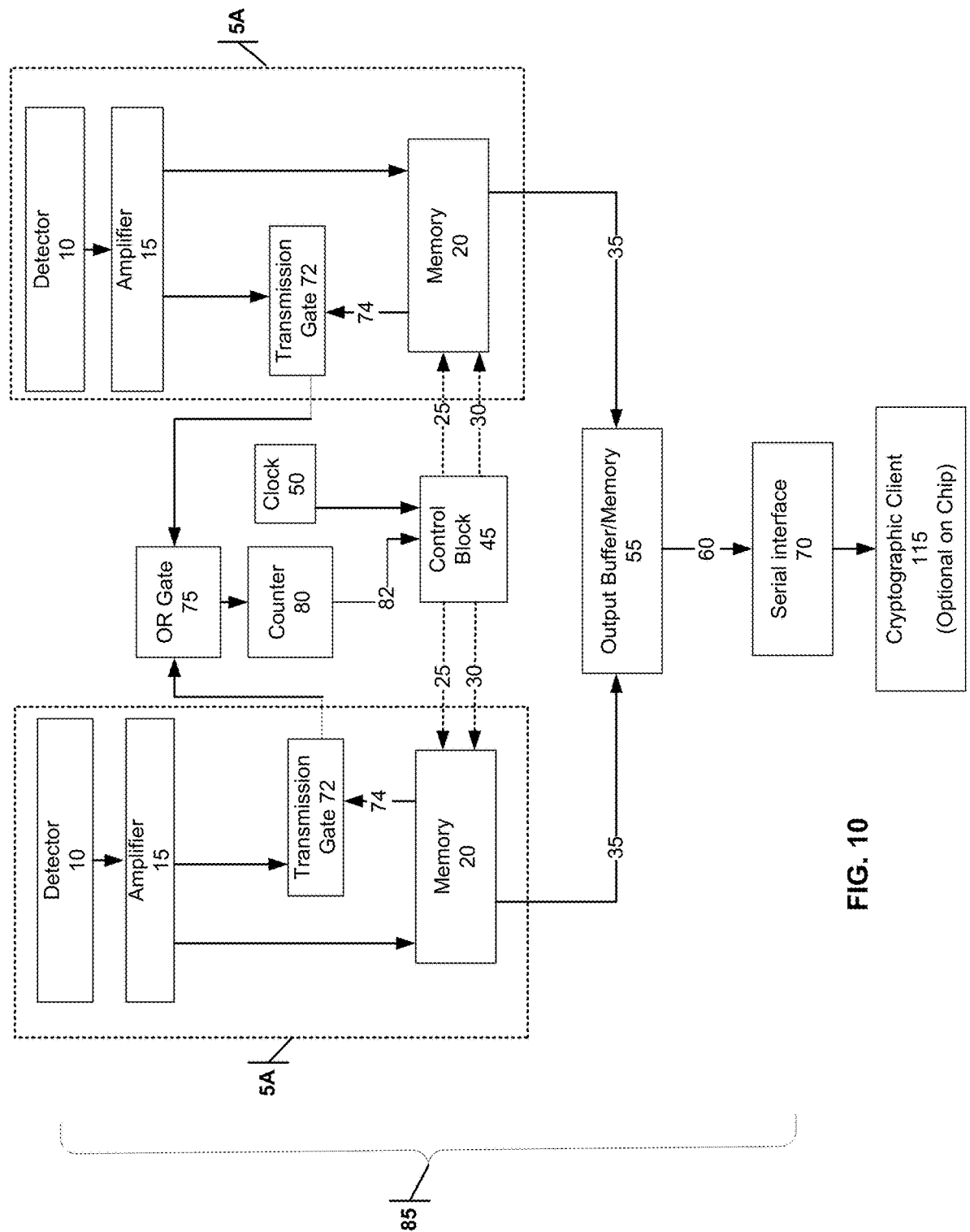
FIG. 10 is a flow diagram of the various components that may be placed on the integrated circuit corresponding to the FIG. 7 arrangement.

FIG. 9 is a flow diagram of the various components that may be placed on the integrated circuit, using cell 5. Likewise, FIG. 10 is a flow diagram of the various components that may be placed on the integrated circuit, using cell 5A. FIGS. 8B, 9A, and 9B illustrate a TRNG 85 with an enclosure 90 enclosing a radiation source 95 (preferably radioactive nickel), a cavity 100 separating the radioactive nickel from a linear array (40, 40a) of cells (5, 5a). The cells include a silicon substrate 8 with a detector 10 constructed to detect electrons within the cavity from the decay of the radioactive nickel and to produce a signal for the detected electrons. The amplifier 15 connected to the detector 10 amplifies the signal and passes it to the memory 20 for storage. A control block 45 is connected to each cell (5, 5a) in the linear array (40, 40a), and (a) sends a word line signal 25 to each cell (5, 5A), causing the memory 20 to report its contents to an output buffer/memory 55 via a bit line 35; and also (b) sends a reset signal 30 to each cell (5, 5A), causing the memory 20 to erase.

Various example embodiments of the present apparatus, systems, and methods demonstrate that ICs can be impregnated with radioactive material during manufacturing. Even with a very small quantity of radioactive nickel, each such chip can generate a significant number of random bits per second, see Table 1 above: $6.4 \cdot 10^8$ bits/(s·$cm^2$). Then, these bits can be stored for later use in a solid-state memory incorporated inside the IC. Thus, such a standalone TRNG on-chip can easily provide on-demand thousands of multibyte random numbers needed for the encryption of communication channels (like voice or text messages) or for those processes requiring plenty of random numbers (like simulations or gaming).

Any of the suitable technologies, materials, and designs set forth and incorporated herein may be used to implement various example aspects of the invention as would be apparent to one of skill in the art.

Although exemplary embodiments and applications of the invention have been described herein, including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system, or method falls within the scope of one of the claims that are allowed by the patent office based on this or any related patent application.

The invention claimed is:

1. A true random number generator (TRNG) comprising:
   an enclosure enclosing:
      radioactive nickel;
      a cavity separating the radioactive nickel from a linear array of cells, wherein each cell in the linear array comprises:
         a silicon substrate comprising;
            a detector constructed to detect electrons within the cavity from the decay of the nickel and to produce a signal for the detected energy;
            an amplifier connected to the detector and constructed to amplify the signal;
            a memory connected to the amplifier and constructed to store the signal;
      a control block connected to each cell in the linear array, and constructed to (a) send a word line signal to each cell causing the memory to report its contents to an output buffer/memory via a bit line; and (b) send a reset signal to each cell causing the memory to erase.

2. The TRNG of claim 1, wherein processing circuitry is connected to the detector with a through silicon via (TSV), wherein the silicon substrate at least partially shields the processing circuitry from electrons emitted by the radioactive nickel, and wherein the processing circuitry comprises one or more of the following: the amplifier, the memory, and the control block.

3. The TRNG of claim 1, further comprising a clock connected to the control block, wherein the control block uses the clock to manage the word line signal and the reset signal for the linear array of cells.

4. The TRNG of claim 3, further comprising a serial interface connected to the output buffer/memory of each cell.

5. The TRNG of claim 4, wherein the serial interface comprises a plurality of serial interfaces.

6. The TRNG of claim 5, wherein the clock comprises a slow clock and a fast clock, and wherein the control block uses the fast clock to manage the word line signal and uses the slow clock to manage the reset signal.

7. The TRNG of claim 6, wherein the clock further comprises a frequency divider to maintain a relationship between the slow clock and the fast clock.

8. The TRNG of claim 1, wherein each cell in the linear array comprises a transmission gate connected to the amplifier.

9. The TRNG of claim 8, wherein the time between reset signals defines a readout period, the TRNG further comprising an OR gate connected to the transmission gate of each cell, and wherein for each cell the OR gate is adapted to produce a single counting signal to a counter during a readout period when the detector detects electrons within the cavity from the decay of the nickel.

10. The TRNG of claim 9, wherein the counter is constructed to send a stop signal to the control block when a predetermined number of counting signals have been counted.

11. The TRNG of claim 9, wherein the counter is constructed to reset itself when a predetermined number of counting signals have been counted.

12. The TRNG of claim 9, wherein in response to the stop signal, the control block sends the word line signal and the reset signal to each cell.

13. The TRNG of claim 9, wherein the predetermined number of counting signals is 512.

14. The TRNG of claim 1, further comprising a cryptographic client.

15. The TRNG of claim 1, wherein the linear array comprises 1024 cells.

16. The TRNG of claim 1, further comprising a matrix of the linear array of cells.

17. The TRNG of claim 1, wherein the matrix is comprised of 1024 by 1024 cells.

* * * * *